US009305173B2

(12) United States Patent
Cronce et al.

(10) Patent No.: US 9,305,173 B2
(45) Date of Patent: Apr. 5, 2016

(54) PORTABLE AUTHORIZATION DEVICE FOR AUTHORIZING USE OF PROTECTED INFORMATION AND ASSOCIATED METHOD

(75) Inventors: Paul Allen Cronce, San Jose, CA (US); Joseph M. Fontana, San Jose, CA (US)

(73) Assignee: Pace Anti-Piracy, Inc., Campbell, CA (US)

( * ) Notice: Subject to any disclaimer, the term of this patent is extended or adjusted under 35 U.S.C. 154(b) by 2315 days.

(21) Appl. No.: 11/394,589

(22) Filed: Mar. 31, 2006

(65) Prior Publication Data

US 2006/0174349 A1  Aug. 3, 2006

Related U.S. Application Data

(63) Continuation of application No. 09/503,778, filed on Feb. 14, 2000, now Pat. No. 7,032,240.

(60) Provisional application No. 60/169,506, filed on Dec. 7, 1999.

(51) Int. Cl.
*H04L 29/00* (2006.01)
*G06F 21/62* (2013.01)
*H04L 9/32* (2006.01)
(Continued)

(52) U.S. Cl.
CPC .......... *G06F 21/6209* (2013.01); *H04L 9/0838* (2013.01); *H04L 9/16* (2013.01); *H04L 9/3271* (2013.01); *G06F 2221/2103* (2013.01); *G06F 2221/2153* (2013.01); *H04L 2209/56* (2013.01); *H04L 2209/60* (2013.01)

(58) Field of Classification Search
USPC ...................... 713/159, 184; 380/30; 235/382
See application file for complete search history.

(56) References Cited

U.S. PATENT DOCUMENTS

| 4,562,306 A | 12/1985 | Chou et al. |
| 4,601,011 A * | 7/1986 | Grynberg ...................... 713/184 |
| 4,609,777 A | 9/1986 | Cargile |

(Continued)

FOREIGN PATENT DOCUMENTS

| FR | 90 11675 | 3/1992 |
| WO | WO 98/07255 | 2/1998 |

OTHER PUBLICATIONS

Coffee P., "Wear of prosecution prompts comeback of hardware keys", PC Week, vol. 6, No. 13, p. 13, Apr. 3, 1989.
(Continued)

*Primary Examiner* — Brandon Hoffman
*Assistant Examiner* — Michael D Anderson
(74) *Attorney, Agent, or Firm* — Convergent Law Group LLP

(57) ABSTRACT

An authorization system and associated method for selectively authorizing a host system to use one or more items of protected information associated with the host system. The authorization system includes a portable authorization device that is removably couplable to the host system. The portable authorization device is capable of receiving and storing multiple items of authorization information associated with a plurality of respective items of protected information from one or more information authorities. Preferably, the portable authorization device is capable of communicating with multiple types of information authorities. The portable authorization device selectively authorizes the host system to use the one or more respective items of protected information based upon the respective authorization information stored therein.

27 Claims, 7 Drawing Sheets

(51) Int. Cl.
*H04L 9/08* (2006.01)
*H04L 9/16* (2006.01)

(56) References Cited

U.S. PATENT DOCUMENTS

| | | | |
|---|---|---|---|
| 4,652,990 A | 3/1987 | Pailen et al. | |
| 4,683,553 A | 7/1987 | Mollier | |
| 4,747,139 A | 5/1988 | Taaffe | |
| 4,796,181 A | 1/1989 | Wiedemer | |
| 4,799,153 A | 1/1989 | Hann et al. | |
| 4,827,508 A | 5/1989 | Shear | |
| 4,932,054 A | 6/1990 | Chou et al. | |
| 4,935,962 A * | 6/1990 | Austin | 713/159 |
| 4,977,594 A | 12/1990 | Shear | |
| 5,047,928 A | 9/1991 | Wiedemer | |
| 5,050,213 A | 9/1991 | Shear | |
| 5,081,676 A | 1/1992 | Chou et al. | |
| 5,120,939 A * | 6/1992 | Claus et al. | 235/382 |
| 5,212,279 A | 5/1993 | Nomura et al. | |
| 5,222,133 A | 6/1993 | Chou et al. | |
| 5,293,424 A | 3/1994 | Holtey et al. | |
| 5,329,623 A | 7/1994 | Smith et al. | |
| 5,337,357 A | 8/1994 | Chou et al. | |
| 5,343,524 A | 8/1994 | Mu et al. | |
| 5,353,124 A | 10/1994 | Chou et al. | |
| 5,357,573 A | 10/1994 | Walters | |
| 5,359,495 A | 10/1994 | Margalit et al. | |
| 5,375,037 A | 12/1994 | Le Roux | |
| 5,386,369 A | 1/1995 | Christiano | |
| 5,390,297 A | 2/1995 | Barber et al. | |
| 5,410,598 A | 4/1995 | Shear | |
| 5,448,045 A | 9/1995 | Clark | |
| 5,497,464 A | 3/1996 | Yeh | |
| 5,500,517 A | 3/1996 | Cagliostro | |
| 5,540,597 A | 7/1996 | Budman et al. | |
| 5,542,045 A | 7/1996 | Levine | |
| 5,564,055 A | 10/1996 | Asnaashari et al. | |
| 5,584,043 A | 12/1996 | Burkart | |
| 5,590,193 A | 12/1996 | Le Roux | |
| 5,596,739 A | 1/1997 | Kane et al. | |
| 5,610,981 A | 3/1997 | Mooney et al. | |
| 5,615,393 A | 3/1997 | Kikinis et al. | |
| 5,638,444 A | 6/1997 | Chou et al. | |
| 5,664,950 A | 9/1997 | Lawrence | |
| 5,671,412 A | 9/1997 | Christiano | |
| 5,706,426 A | 1/1998 | Hsu | |
| 5,737,424 A | 4/1998 | Elteto et al. | |
| 5,778,071 A * | 7/1998 | Caputo et al. | 713/159 |
| 5,784,460 A * | 7/1998 | Blumenthal et al. | 705/51 |
| 5,812,662 A | 9/1998 | Hsu et al. | |
| 5,826,011 A | 10/1998 | Chou et al. | |
| 5,854,891 A | 12/1998 | Postlewaite et al. | |
| 5,878,142 A * | 3/1999 | Caputo et al. | 713/159 |
| 6,449,651 B1 * | 9/2002 | Dorfman et al. | 709/229 |
| 6,463,535 B1 * | 10/2002 | Drews | 713/176 |

OTHER PUBLICATIONS

Methvin D., "Security key: pros and cons", PC Week, vol. 8, No. 21, p. 111, May 27, 1991.

"Take Control of Your Desktop", Pcdefender, Tritheim Technologies, Inc., Technical information, www.tritheim.com/pcdefender/technical.html, Jul. 27, 1999, 7 pgs.

Souccar M., "MasterCard's Chip Card Chief Jumps to Publicard", The American Banker, Cards, p. 13, Jan. 11, 1999, 3 pgs.

Dennis S., "Tritheim Gets Patent for Virtual Token Tech", Newsbites, Jan. 28, 1999, 2 pgs.

*The Seybold Report on Internet Publishing*, Dec. 1997, No. 4, vol. 2, pp. 3-9.

\* cited by examiner

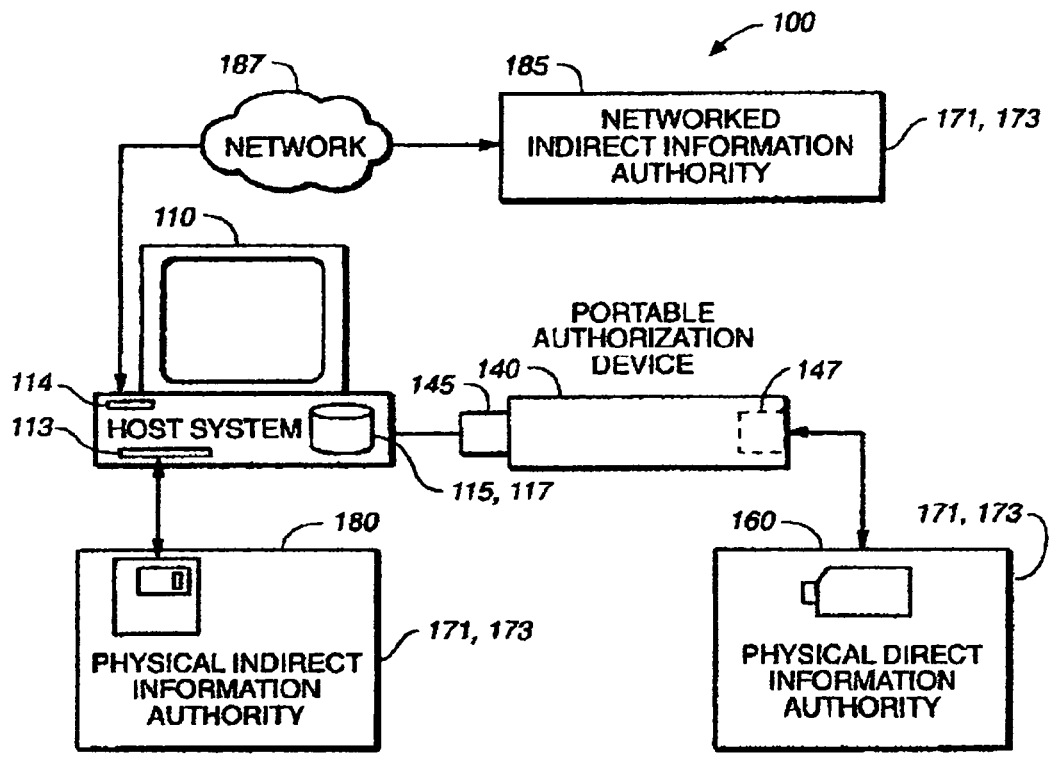
FIG._1
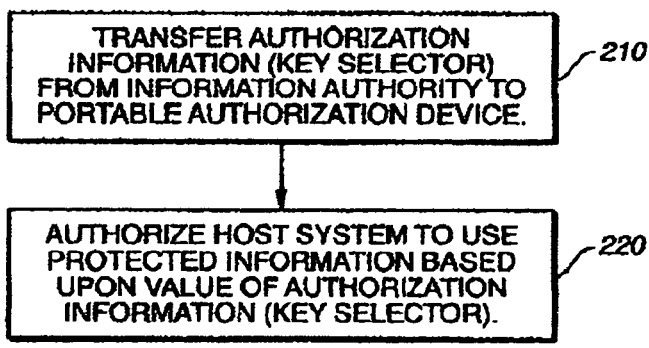
FIG._2

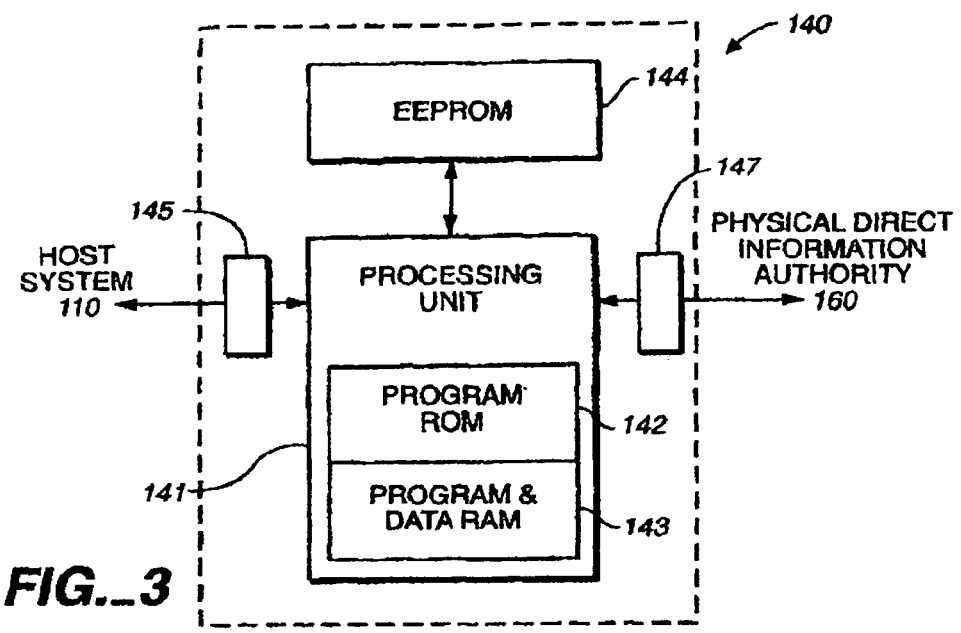
FIG._3
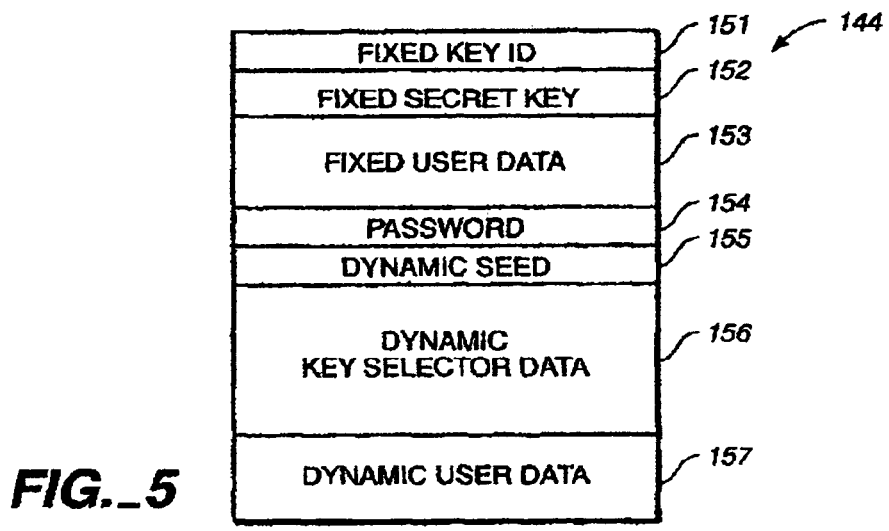
FIG._5

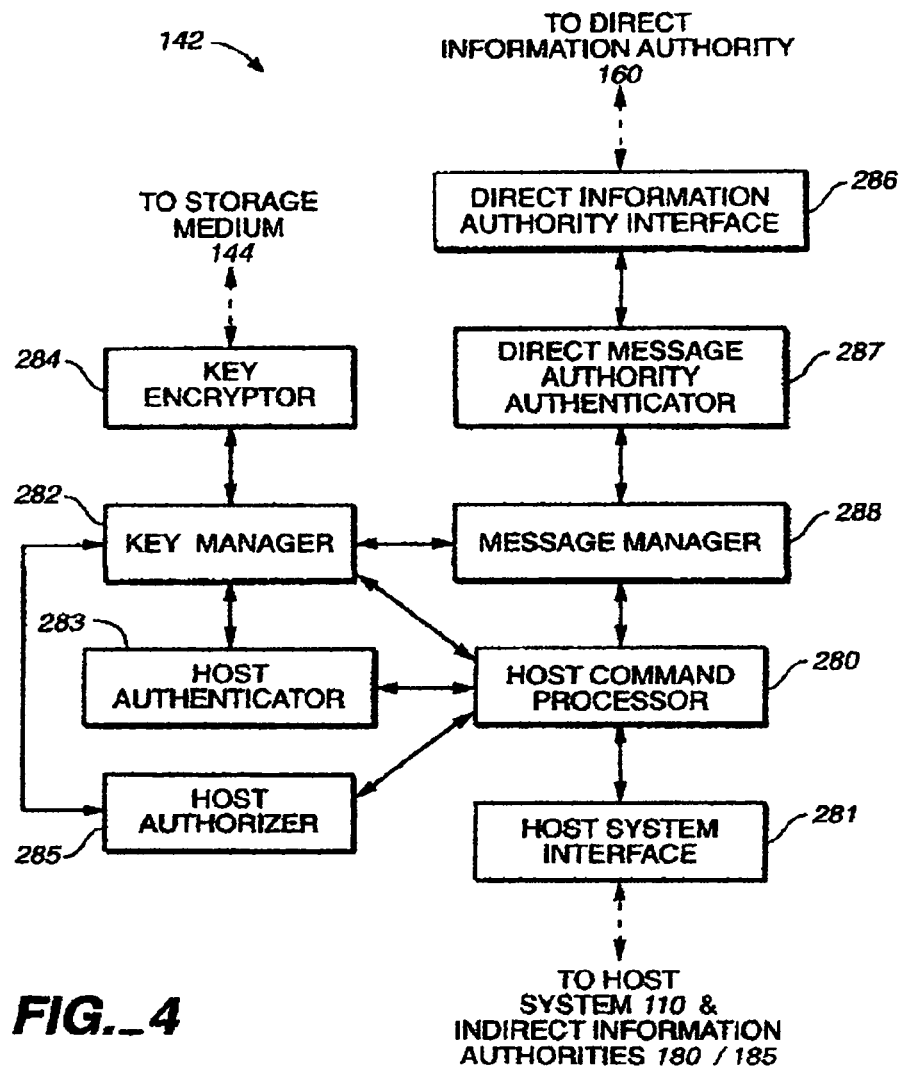
FIG._4
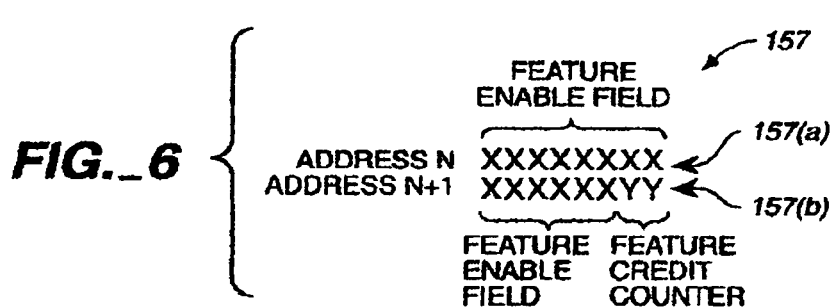
FIG._6

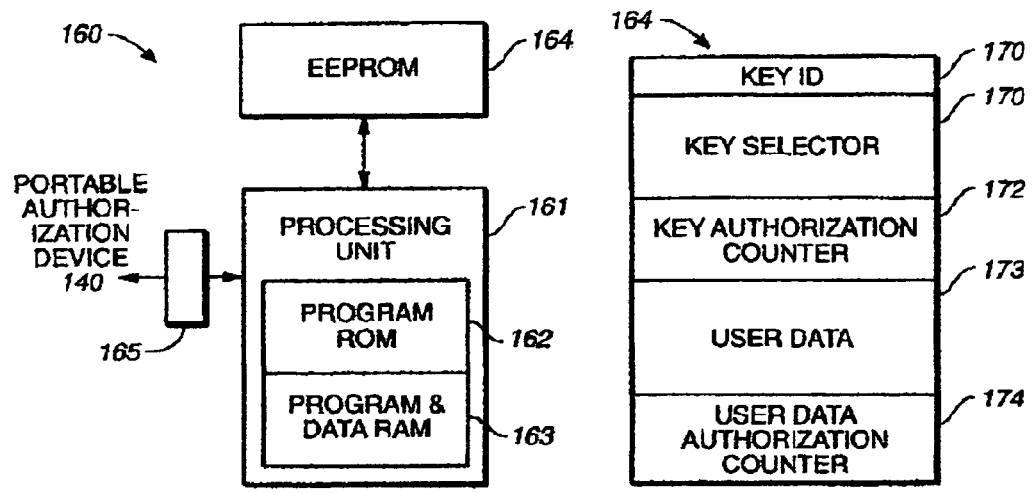
FIG._7  FIG._8
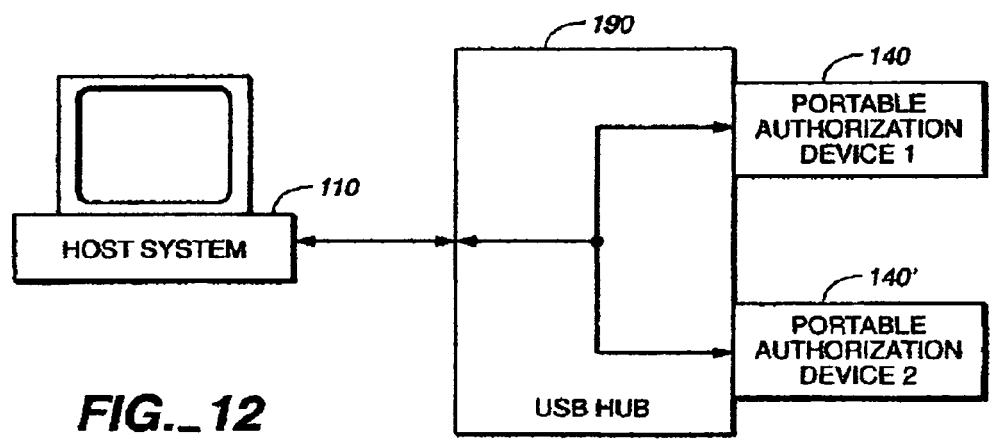
FIG._12

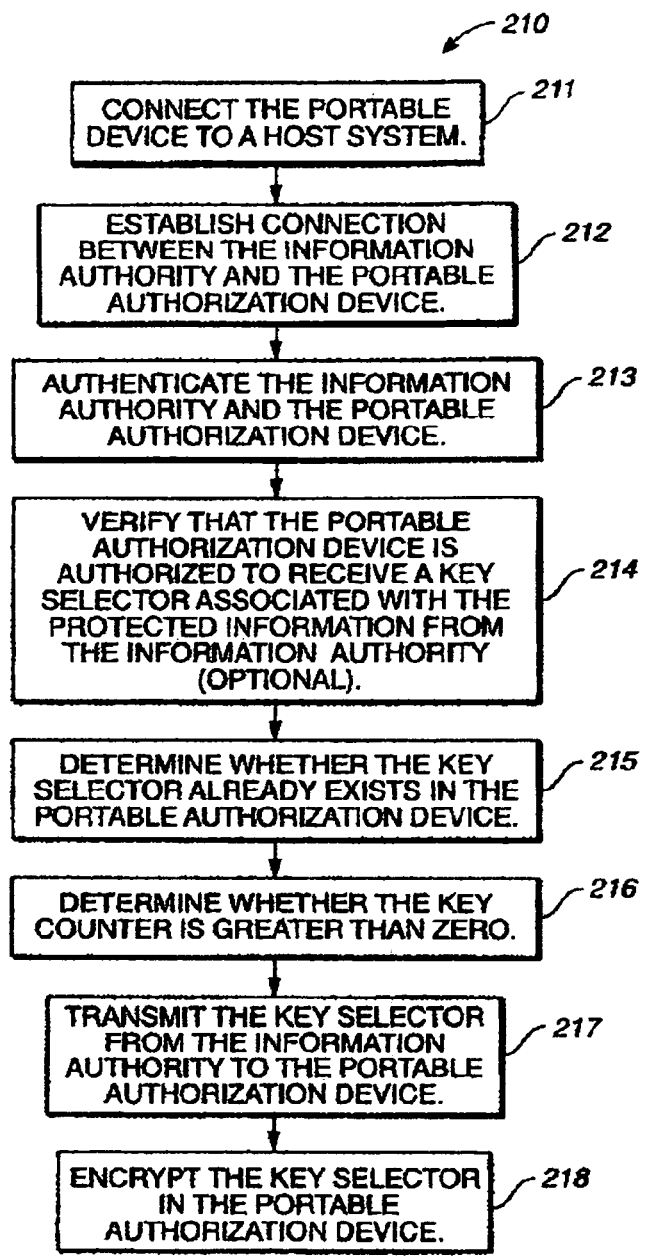
FIG._9

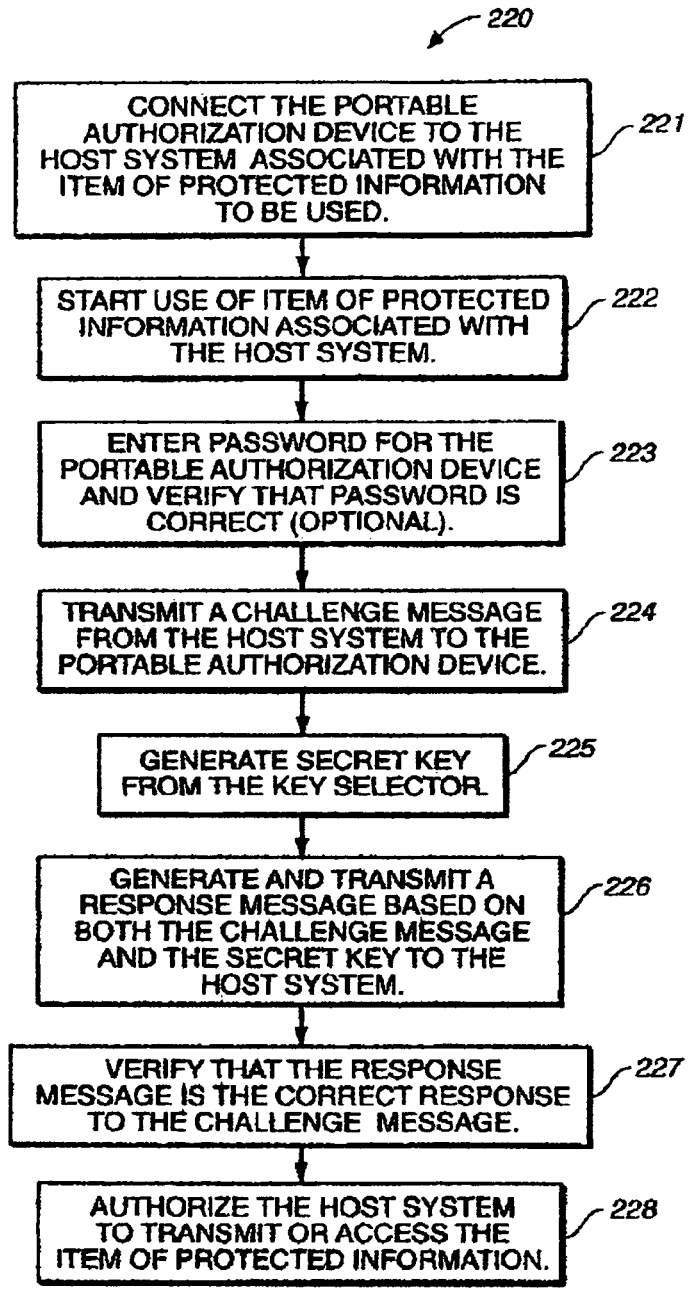
FIG._10

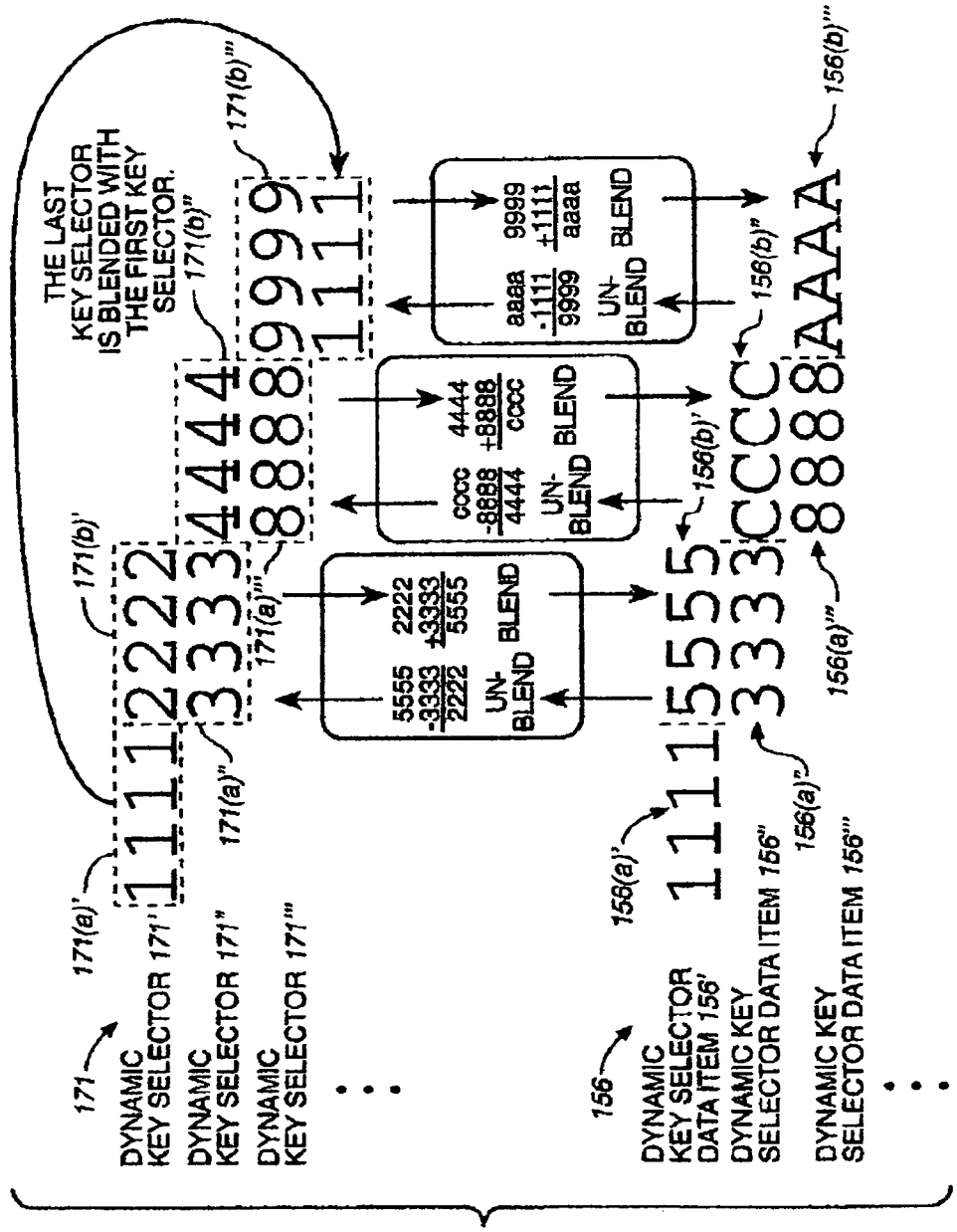
FIG._11

PORTABLE AUTHORIZATION DEVICE FOR AUTHORIZING USE OF PROTECTED INFORMATION AND ASSOCIATED METHOD

CROSS-REFERENCE TO RELATED APPLICATIONS

This application is a Continuation of U.S. patent application Ser. No. 09/503,778, filed Feb. 14, 2000, and assigned to the same assignee as the present invention.

BACKGROUND OF THE INVENTION

1. Field of the Invention

This invention relates generally to techniques for authorizing the use of protected information and, in particular, to a portable authorization device (commonly known as a "dongle") for authorizing a host system to use protected information.

2. Description of the Related Art

A software "wrapper" is a commonly used technique for selectively authorizing the use of protected information associated with a host system such as a personal computer or a server. The protected information, for example, may comprise a software program to be executed, or data to be processed, by the host system. The software wrapper permits an end-user to access or execute the protected program or data only if a predetermined condition is met. The predetermined condition can be, for example, the running of a trial period that allows the end-user to evaluate the protected program or data or the presentation of the proper authorization information by the end-user. The authorization information, for example, may be a password manually entered by the end-user or digitally encoded data. A discussion of software wrappers can be found, for example, in *The Seybold Report on Internet Publishing*, December 1997, no. 4, vol. 2, p. 3.

There are several techniques known in the art for delivering authorization information to authorize a host system to use protected information. In one technique, the authorization information is stored on a portable authorization device that is commonly known as a "dongle." Dongles are small, readily transportable electronic devices as described, for example, in U.S. Pat. No. 4,562,306. Dongles are typically provided by the software vendor together with the wrapped software program they are intended to authorize.

To enable the software program to run on a particular computer, the end-user simply connects the dongle to a communications port of the computer, such as a parallel port or Universal Serial Bus (USB) port. Therefore, the end-user can authorize a number of different computers to run the program simply by connecting the dongle to whichever computer that he or she desires to run the program on at any given time.

However, a disadvantage presented by dongles is that they typically store authorization information for only one software program or perhaps for a group of software programs from a single vendor. Consequently, because an end-user typically might use several software programs from multiple vendors at any given time, he or she might have to carry around multiple dongles, which could be cumbersome and inconvenient.

Another disadvantage is that the authorization information stored in the dongle is typically set by the software vendor during manufacture and generally cannot be subsequently updated. As a result, when a software vendor provides an end-user with a software upgrade, add-on or plug-in, etc. for a protected software program, the vendor often also delivers a new dongle to authorize the associated software. This is not very cost-effective for software vendors because the cost of the dongle itself can be significant in relation to the value of the associated software.

In a second technique known in the art, the authorization information is stored on a magnetic floppy disk known as a "key diskette." The key diskette may be considered a type of information authority, which is a secure and trusted device for transmitting and receiving information. The key diskette is typically provided by the software vendor with the wrapped software program. To authorize the software program to run on a particular computer, the end-user inserts the key diskette in the computer to transfer the authorization information, typically a secret key, from the key diskette to the hard disk drive of the computer. Before the computer begins execution of the program, the software wrapper verifies that the correct key is present on the hard disk drive, and if so, allows the computer to execute the program. This technique is used in the Pace Anti-Piracy InterLok product, which was developed by the applicant of the present invention.

An advantage of this technique over dongles is that authorization information for many different software programs from multiple vendors can be stored on the hard disk drive of the computer. Consequently, an end-user who runs multiple programs on a computer does not need to keep multiple key diskettes on hand to authorize each of the programs.

This technique suffers from several shortcomings, however. First, the authorization information is not readily transferable between computers. Typically, the key diskette is permitted to transfer the authorization information to only a limited number of computers at any given time. Once the authorization information is transferred to a particular computer, the authorization cannot be readily transferred from that computer to another computer because it is stored on that computer's internal hard disk drive. Consequently, if the end-user wants to authorize a new computer to run a software program but the key diskette has run out of authorizations, the authorization information must be removed from one of the computers containing the authorization information and transferred to the new computer—a rather cumbersome operation. Therefore, unlike dongles, this technique does not allow authorization information to be readily transferred between computers. Another disadvantage of this technique is that floppy disks are gradually being phased out of use as data input devices for computers so that in the near future computers may not be able to read the key diskettes.

A third technique described in U.S. Pat. No. 5,854,891, issued to Postlewaite ("the '891 patent") describes a security device for enabling selected functions to be performed by or within a computer connected to the security device. The security device includes a smart card reader for reading data from smart cards, which may be considered to be a type of information authority. The security device also includes a control module having a segmented non-volatile memory composed of a plurality of segments. Enabling data from a plurality of smart cards is read by the smart card reader and entered into the segmented non-volatile memory. Each segment of the segmented non-volatile memory creates a virtual token essentially duplicating the enabling ability of the corresponding smart card. The security device is detachable from the computer and thus can be used to enable functions on multiple computers.

An advantage of the security device described in the '891 patent is that it is relatively inexpensive for a software vendor to provide authorization information for software updates, add-ons, plug-ins, etc. because the authorization information is delivered using smart cards rather than dongles. Smart cards are significantly less expensive than conventional dongles because they are typically implemented with simpler hardware.

However, the security device of the '891 patent suffers from several disadvantages. First, the security device requires a "segmented" memory to prevent the smart cards stored in the memory from interfering with each other and possibly corrupting one another's data. This increases the complexity and cost of the security device because it necessitates that the device implement memory management or protection mechanisms in hardware and/or software. Second, the security device apparently is not capable of receiving authorization information from multiple types of information authorities. The '891 patent mentions that the security device can receive enabling data or authorization information from smart cards. However, the patent does not disclose or suggest that the device can receive authorization information from other types of information authorities, such as floppy disks or computer servers. Consequently, it appears that the use of the security device as an authorization device is limited to those software vendors that support smart cards as a data delivery mechanism.

In view of the shortcomings of the above-described techniques, it is an object of the invention to provide an authorization device for authorizing the use of protected information that can be updated with new authorization information and yet is removably couplable to host devices, readily portable and relatively inexpensive.

A second object of the invention is to provide a portable authorization device that can receive and store authorization information from multiple types of information authorities.

A third object of the invention is to provide a portable authorization device that offers a high level of security to prevent unauthorized access to the authorization information when stored or being transmitted.

SUMMARY OF THE INVENTION

The invention provides an authorization system and associated method for selectively authorizing a host system to use one or more items of protected information associated with the host system. The authorization system includes a portable authorization device that is removably couplable to the host system. The portable authorization device is capable of receiving and storing multiple items of authorization information associated with a plurality of respective items of protected information from one or more information authorities. Preferably, the portable authorization device is capable of communicating with multiple types of information authorities.

The portable authorization device of the present invention selectively authorizes the host system to use the one or more respective items of protected information based upon the respective authorization information stored therein.

These and other features of the invention will be better appreciated from the following detailed description of the invention together with the appended drawings.

BRIEF DESCRIPTION OF THE DRAWINGS

FIG. 1 is a diagram of an authorization system for selectively authorizing a host system to use a plurality of items of protected information in accordance with a presently preferred embodiment of the invention, including a portable authorization device, a host system and multiple types of information authorities.

FIG. 2 is a flow chart of the operation of the authorization system shown in FIG. 1 to authorize the host system.

FIG. 3 is a diagram of the hardware components of the portable authorization device shown in FIG. 1.

FIG. 4 is a diagram of the functional components executed by the portable authorization device shown in FIG. 3.

FIG. 5 is a diagram of the data stored in the EEPROM of the portable authorization device shown in FIG. 3.

FIG. 6 is a diagram showing the format of the dynamic user data stored in the EEPROM of the portable authorization device shown in FIG. 3.

FIG. 7 is a diagram of the hardware components of the physical direct information authority shown in FIG. 1.

FIG. 8 is a diagram of the data stored in the EEPROM of the physical direct information authority shown in FIG. 7.

FIG. 9 is a flow chart showing the details of the key exchange process shown in FIG. 2.

FIG. 10 is a flow chart showing the details of the host system authorization process shown in FIG. 2.

FIG. 11 illustrates an exemplary key blending algorithm for blending the dynamic key selectors stored in the EEPROM of the portable authorization device.

FIG. 12 is a diagram showing a key exchange between two portable authorization devices in accordance with an alternative embodiment of the invention.

DETAILED DESCRIPTION OF THE PREFERRED EMBODIMENTS

The invention comprises an authorization system including a portable authorization device and associated method for selectively authorizing a host system to use a plurality of items of protected information. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Moreover, in the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail. Thus, the invention is not intended to be limited to the embodiment shown, but is to be accorded the widest scope consistent with the principles and features disclosed herein.

FIG. 1 illustrates an authorization system 100 in accordance with a presently preferred embodiment of the invention. The authorization system 100 comprises one or more access control programs 117 associated with a host system 110, a portable authorization device 140, and one or more information authorities 160, 180 and 185. The authorization system 100 selectively authorizes the host system 110 to use a plurality of items of protected information 115 associated with the host system, as described in detail below.

Each of the access control programs 117, which may also be referred to as a "software wrapper," is used to control access to one of the respective items of protected information 115. The access control program 117 authorizes the host system 110 to use the associated item of protected information 115 only if the end-user provides the correct authorization information to the access control program. The access control programs 117, in conjunction with the host system 110, are also used to control communications between the indirect information authorities 180 and 185 and the host system 110. Each item of protected information 115 and respective access control program 117 are typically provided by the software vendor as an integrated product for installation on the host system 110.

In a presently preferred embodiment of the invention, the items of protected information 115 may each comprise a software program or data. The host system 110 in this embodiment may comprise a personal computer or a server computer connected to a network.

The portable authorization device 140 of the authorization system 100 is a relatively small and simple "dongle-like" device that stores one or more items of authorization information 171 for authorizing the host system 110 to use the respective items of protected information 115. The portable authorization device 140 includes a microprocessor or dedicated logic for performing secure transactions with the host system 110 and a memory for storing the authorization information 171. Like a conventional dongle, the portable authorization device 140 is readily transportable and can be used with a number of different host systems 110. To use the portable authorization device 140 with a host system 110, the end-user may simply connect the device to a communications port of the host system, such as a parallel port or USB port. Unlike a conventional dongle, however, the portable authorization device 140 can store multiple items of authorization information 171 to authorize the use of respective items of protected information 115.

Furthermore, the portable authorization device 140 can be updated with new authorization information 171 from information authorities 160/180/185, as explained below. An advantage provided by this feature is that it is relatively inexpensive for a software vendor to authorize the use of a new version of software. The vendor can update the portable authorization device 140 with the new authorization information by providing a relatively simple and inexpensive information authority, rather than a dongle, to the end-user.

In a presently preferred embodiment of the invention, the authorization information 171 stored in the portable authorization device 140 comprises one or more dynamic key selectors, which are used to derive the secret keys. In other embodiments, the authorization information 171 may consist of one or more secret keys. The portable authorization device 140 may be referred to as a "key repository," as it is used to store multiple dynamic key selectors or keys for authorization purposes.

The information authorities 160, 180 and 185 are trusted devices for transmitting and receiving information, such as messages, from the portable authorization device 140. The information authorities 160, 180 and 185 provide respective authorization information 171 for transmission to the portable authorization device 140 to authorize the use of the items of protected information 115. In a presently preferred embodiment, the information authorities 160, 180 and 185 comprise message authorities for transmitting and receiving messages from the portable authorization device 140. The information authorities 160, 180 and 185 may be used, for example, by software vendors as a means to deliver software, upgrades, authorization information, etc. to end-users.

In a presently preferred embodiment of the invention, the authorization information 171 transmitted by the information authorities 160, 180 and 185 comprises dynamic key selectors, which do not themselves authorize the use of the protected information 115 on the host system 110, but are used to generate the secret keys that perform such authorization. In other embodiments, however, the authorization information 171 may comprise the secret keys themselves.

In addition to providing authorization information 171, the information authorities 160, 180 and 185 may also provide user data 173 and other types of data for transmission to the portable authorization device 140. The user data 173 transmitted by the information authorities 160, 180 and 185 may be used to replace or update the user data stored in the portable authorization device 140. Alternatively, for example, the user data 173 may comprise data that enables specific security options in the portable authorization device 140.

The authorization system 100 may support multiple types of information authorities. The types of information authorities supported may include a physical direct information authority 160, a physical indirect information authority 180 and a networked indirect information authority 185. The multiple types of information authorities 160, 180 and 185 each communicate with the portable authorization device 140 in a different manner, as explained below. An advantage provided by this feature is that, unlike the security device of the '891 patent, the portable authorization device 140 is capable of receiving software, upgrades or authorization information from multiple software vendors supporting different types of information authorities, such as magnetic media (e.g., key diskettes), servers connected to the Internet, smart cards, etc.

The access control programs 117 of the host system 110 may be used to control which of the information authorities 160, 180 and 185 are permitted to communicate with the portable authorization device 140. The access control programs 117 may also be used to control the order in which the information authorities are to be accessed by the portable authorization device. The access control programs 117 can be configured with this information by the software vendor prior to delivery of the respective items of protected information 115 to the user.

A physical direct information authority 160 can be a relatively small, simple and transportable device that stores authorization information 171 and other data associated with one or more items of protected information 115 for transmission to the portable authorization device 140. The direct information authority 160 is "direct" in that it communicates directly with the portable authorization device 140 rather than through some intermediary device. The physical direct information authority 160 interfaces with the portable authorization device 140 by being placed either in direct contact with, or in close physical proximity to, the authorization device. The physical direct information authority 160 includes a microprocessor or dedicated logic for performing secure transactions with the portable authorization device 140 and a memory for storing the authorization information 171 and other data.

Unlike a conventional dongle or smart card, the physical direct information authority 160 is not required to perform or support the authorization process itself, but merely can provide an item of authorization information used to perform the authorization. As a result, the physical direct information authority 160 can have more modest hardware and software requirements than either a dongle or a smart card, and can be smaller and less expensive. Examples of physical direct information authorities 160 include smart cards as well as devices with more rudimentary processing and storage capabilities than smart cards.

The physical direct information authority 160 is typically supplied to the end-user by the vendor of the item of protected information 115 together with the protected information. The physical direct information authority 160 may be referred to as a "license chip," as it in effect confers a license to use the item of protected information 115.

The physical indirect information authority 180 and the networked indirect information authority 185 are devices that communicate with the portable authorization device 140 through the host system 110, and are thus "indirect." The access control programs 117 of the host system 110 control which one of the indirect information authorities 180 or 185 communicates with the portable authorization device 140 at any given time. The access control programs 117 also provide the communication protocol for communications between the indirect information authorities 180 and 185 and the host system 110.

The physical indirect information authority 180 can be a physical medium that stores authorization information 171 and other data associated with one or more items of protected information 115. In a preferred embodiment of the invention, the physical indirect information authority 180 is a magnetic medium, such as the "key diskette" described above, that is inserted into a floppy disk drive 113 on the host system 110. Unlike conventional key diskettes, however, the physical indirect information authority 180 transfers the authorization information 171 to the portable authorization device 140, rather than to the host system 110, for storage. The physical indirect information authority 180 is significantly less expensive than a dongle due to its relative simplicity. The physical indirect information authority 180 is typically supplied by the vendor of the item of protected information 115 together with the protected information.

The networked indirect information authority 185 can be a system, such as a computer server, that stores authorization information 171 and other data associated with one or more items of protected information 115. Unlike conventional networked schemes, however, the networked indirect information authority 185 transmits the authorization information 171 to the portable authorization device 140, rather than to the host system 110, for storage. The networked indirect information authority 185 is connected to a network 187, such as the Internet, and communicates with the portable authorization device 140 via the network 187, the host system 110 and the host system interface circuit 145. The networked indirect information authority 185 is typically operated by the vendor of the item of protected information 115.

In a presently preferred embodiment of the invention, the authorization information 171 stored in the information authority 160/180/185 comprise dynamic key selectors. The dynamic key selectors do not themselves authorize the use of the protected information 115 on the host system 110, but are used to generate the secret keys that perform such authorization. As described in detail below, the portable authorization device 140 uses one of the dynamic key selectors 171 to generate a secret key, i.e., an item of generated authorization information 175, for authorizing the use of the item of protected information 115. Thus, unlike the security device of the '891 patent described above, which merely duplicates the enabling ability of the smart cards that it reads, the portable authorization device 140 is capable of generating the authorization information internally. An advantage of this feature is that it prevents the generated authorization information 175 from being intercepted during transmission, thereby providing the authorization system 100 with increased security.

FIG. 2 illustrates the overall process employed by the authorization system 100 in a presently preferred embodiment of the invention to selectively authorize the host system 110 to use an item of protected information 115 associated with the host system. The authorization process actually involves numerous steps and will be explained in greater detail below. The authorization process is coordinated by the access control program 117 associated with the item of protected information 115 running on the host system 110.

The authorization process involves two basic steps. First, the information authority 160/180/185 transfers the authorization information 171 to the portable authorization device 140 for storage therein (step 210). This step is referred to as a "key exchange." The end-user initiates the key exchange by establishing a connection between the information authority 160/180/185 and the portable authorization device 140, for example, by inserting the direct information authority 160 into a reader on the portable authorization device 140. Second, the portable authorization device 140 authorizes the host system 110 to use the item of protected information 115 (step 220). The end-user initiates this step by connecting the portable authorization device 140 to the host system 110. After this process is completed, the end-user is permitted to use the item of protected information 115 on the host system 110 as required. The first and second steps of the process do not need to be performed consecutively and, in addition, may be performed using different host systems 140.

FIGS. 3 to 11 illustrate a preferred embodiment of the invention in which the authorization information 171 comprises a dynamic key selector and the generated authorization information 175 comprises a secret key. This embodiment protects against unauthorized access to the secret key because it does not transmit the secret key itself between the information authority 160/180/185 and the portable authorization device 140. In other embodiments, the authorization information 171 and the generated authorization information 175 may be identical, both comprising the secret key. The generated authorization information 175 in these embodiments is not generated by the portable authorization device 140 but rather, is transmitted from the information authority 160/180/185.

FIG. 3 illustrates the hardware components of the portable authorization device 140 in a presently preferred embodiment of the invention. The portable authorization device 140 includes a processing unit 141, a storage medium 144, the host system interface circuit 145 and the direct information authority interface circuit 147. In this embodiment, the processing unit 141 comprises a microcontroller including a program ROM 142 and a program/data RAM 143. The storage medium 144 in this embodiment comprises an EEPROM, which is a well-known type of non-volatile semiconductor memory device. The program ROM 142 and EEPROM 144 store program code and data, respectively, that are executed or operated on by the processing unit 141 during the operation of the portable authorization device 140.

The host system interface circuit 145 and the direct message interface circuit 147 provide an electrical interface to the host system 110 or the physical direct information authority 160, respectively. In a preferred embodiment of the invention, the host system interface circuit 145 may consist of a USB connector and associated circuitry that connects to a USB port on the host system 110. The direct message interface circuit 147 in this embodiment may consist of a card reader and associated circuitry.

FIG. 4 shows the various functional components executed by the portable authorization device 140 during its operation in a presently preferred embodiment of the invention. In this embodiment, the functional components are implemented as groups of program instructions stored in the program ROM 142 that are executed by the processing unit 141. In other embodiments, the functional components may be implemented with varying combinations of hardware and software. The arrows shown in the figure indicate the functional interdependencies between the components. The functional components of the portable authorization device 140 include:

(1) Host command processor 280. The host command processor 280 is the main processing component of the portable authorization device 140 and manages the operation of the other program ROM components. The host command processor 280, through the host system interface 281, receives and processes commands sent by the access control program 117 of the host system 110. The host command processor 280 includes security routines to ensure that the access control program 117 cannot overstep its authority in controlling the portable authorization device 140, however.

(2) Host system interface 281. The host system interface 281 provides a communications protocol for the portable authorization device 140 to communicate with the host system 110. The host system interface 281, in conjunction with the access control programs 117 of the host system 110, is also used for communications with the physical and networked indirect information authorities 180 and 185. The access control programs 117 handle the portion of the communications occurring between the host system 110 and the indirect information authorities 180 and 185. Information is transmitted between the portable authorization device 140 and the host system 110 via the host system interface circuit 145. In a preferred embodiment of the invention that uses a USB port, the host system interface 281 communicates with the host system 110 using a USB communications protocol.

(3) Key manager 282. The key manager 282 coordinates the storage, removal and verification of dynamic key selectors (i.e., authorization information) 171, dynamic user data 157 and other data in the storage medium 144. The key manager 282 coordinates the storage and removal of dynamic key selectors 171 during key exchange operations between the portable authorization device 140 and the information authorities 160, 180 and 185, as described below. The key manager 282 also coordinates the transfer of dynamic key selectors 171 during the host system authorization process.

(4) Host authenticator 283. The host authenticator 283 is used to verify the identity of (i.e., authenticate) the physical and networked indirect information authorities 180 and 185 so that secure and trusted communications can be established between the portable authorization device 140 and the information authorities. The authentication process is performed to prevent the portable authorization device 140 from inadvertently transmitting confidential information to an unauthorized source and breaching the security of the device. The authentication process is performed before the portable authorization device 140 is allowed to exchange information, e.g., dynamic key selectors 171, with the physical and networked indirect information authorities 180 and 185. If the authentication is successful and if the operation being performed involves the transfer of dynamic key selectors 171 to or from the storage medium 144, the host authenticator 283 then calls the key manager 282 to perform the transfer. In a preferred embodiment of the invention, the host authenticator 283 performs the authentication using a challenge-response transaction, which is a technique known in the art for establishing trusted communications between devices. The challenge-response transaction uses a fixed secret key 152 (see FIG. 5) shared by both the portable authorization device 140 and the indirect information authorities 180 and 185 to authenticate the information authority. In other embodiments of the invention, the host authenticator 283 may use other authentication methods, such as exchanging passwords.

(5) Key encryptor 284. The key encryptor 284 is used to encrypt and decrypt (or more generally, encode and decode) the dynamic key selectors (i.e., authorization information) 171, dynamic user data 157 and other associated data in the storage medium 144. The key encryptor 284 performs the encryption and decryption using any of the conventional types of encryption algorithms known in the art, such as block cipher, stream cipher or public key algorithms. The particular algorithm used is unique to the individual portable authorization device 140. In a presently preferred embodiment of the invention, the key encryptor 284 is also used to blend and unblend the dynamic key selectors 171, as explained below.

(6) Host authorizer 285. The host authorizer 285 is used to authorize the host system 110 to use the item of protected information 115. The authorization process includes generating the secret key 175 from the dynamic key selector 171 associated with the item of protected information 115. The host authorizer 285 performs the authorization using a challenge-response transaction. The host authorizer 285 works with the key manager 282 to find and retrieve the dynamic key selector 171 from the storage medium 144.

(7) Direct information authority interface 286. The direct information authority interface 286 provides a communications protocol for the portable authorization device 140 to communicate with the physical direct information authority 160. Information is transmitted between the portable authorization device 140 and the direct information authority 160 via the direct information authority interface circuit 147. In a preferred embodiment of the invention, the direct information authority interface 286 communicates with the physical direct information authority 160 using an I2C serial communications protocol.

(8) Direct information authority authenticator 287. The direct information authority authenticator 287 is used to verify the identity of (i.e., authenticate) the physical direct information authority 160 so that secure and trusted communications can be established between the portable authorization device 140 and the direct information authority. The authentication process is performed before the portable authorization device 140 is allowed to allowed to exchange information, e.g., dynamic key selectors 171, with the direct information authority 160. If the authentication is successful and if the operation being performed involves the transfer of dynamic key selectors 171 to or from the storage medium 144, the direct information authority authenticator 287 then calls the key manager 282 to perform the transfer. In a preferred embodiment of the invention, the direct information authority authenticator 287 performs the authentication using a challenge-response transaction. The challenge-response transaction uses a fixed secret key 152 (see FIG. 5) shared by both the portable authorization device 140 and the direct information authority 160 to authenticate the information authority.

(9) Message manager 288. The message manager 288 regulates which messages, e.g., dynamic key selectors 171, transmitted by the information authorities 160, 180 and 185 can be processed by the portable authorization device 140. Conversely, the message manager 288 also regulates which messages can be transmitted by the portable authorization device for processing by the information authorities. The message manager 288 performs this regulation by determining whether the messages are authorized for use with the portable authorization device 140 and halting the processing of those messages without proper authorization. If a message is determined to be authorized, the message manager 288 then calls the direct information authority authenticator 287 to perform the authentication of the information authority 160/180/185.

FIG. 5 shows the contents of the storage medium (i.e., EEPROM) 144 of the portable authorization device 140 in a presently preferred embodiment of the invention. In this embodiment, the contents of the storage medium 144 comprises data that is operated on by the processing unit 141 during operation of the portable authorization device 140. The data stored in the storage medium 144 comprises:

(1) Fixed key ID 151. The fixed key ID 151 is used to indicate the identity of the fixed secret key 152.

(2) Fixed secret key 152. The fixed (or shared) secret key 152 is a secret key that is known and stored in (i.e., shared by) both the portable authorization device 140 and the information authorities 160, 180 and 185. The fixed secret key 152 is used to generate a response message as part of a challenge-response transaction used for authenticating the information authority 160/180/185, as explained below. The fixed key ID 151 and fixed secret key 152 are encrypted using a conventional encryption algorithm.

(3) Fixed user data 153. The fixed user data 153 is used to store alphanumeric strings or other data not related to the authorization function of the portable authorization device 140. The fixed user data 153 may include a manufacturing secret key which identifies the particular product type of the portable authorization device 140 and a serial number that uniquely identifies the individual portable authorization device. The fixed user data 153 is preferably not encrypted.

(4) Password 154. The password 154 is set by the end-user and is unique to the individual portable authorization device 140. The password 154 protects the portable authorization device 140 against unauthorized use, as explained below.

(5) Dynamic seed 155. The dynamic seed 155 is mathematically combined with one of the dynamic key selectors (i.e., authorization information) 171 to generate the secret key (i.e., generated authorization information) 175. The dynamic seed 155 is unique to the individual portable authorization device 140.

(6) Dynamic key selector data 156. In a preferred embodiment of the invention, the dynamic key selector data 156 comprises blended and encrypted dynamic key selectors (i.e., authorization information) 171 stored in the storage medium 144. In other embodiments with lesser security requirements, the dynamic key selectors 171 may be stored in the storage medium 144 without blending. Each item of dynamic key selector data 156 comprises data derived from the blending two or more of the dynamic key selectors 171. The dynamic key selectors 171 are blended in a systematic way such that the dynamic key selector data 156 cannot be partitioned into segments exclusively associated with individual dynamic key selectors. The dynamic key selectors 171 may be blended using any of a variety of mathematical algorithms known in the art, ranging from simple to complex. The blending algorithm selected depends on the degree of security required and the processing and storage capabilities of the portable authorization device 140. An exemplary blending algorithm is described below in association with FIG. 11. The dynamic key selectors 171 are encrypted using a conventional encryption algorithm. The encryption and blending of the dynamic key selectors 171 are performed by the key encryptor 284 stored in the program ROM 142. The dynamic key selector data 156 may also include the key IDs 170 associated with the dynamic key selectors 171. The key IDs 170 are preferably not encrypted or blended. An advantage provided by the blended dynamic key selector data is that it prevents unauthorized access to and tampering with the dynamic key selectors 171, thereby increasing the security of the portable authorization device 140.

(7) Dynamic user data 157. The dynamic user data 157 comprises miscellaneous data stored in the storage medium 144. The structure of the dynamic user data 157 is not necessarily formalized and can be adapted for a variety of uses by the manufacturer of the portable authorization device 140. In one preferred embodiment, the dynamic user data 157 may comprise data pertaining to the end-user of the portable authorization device 140, such as registration information. This data may be transmitted back to the information authority 160/180/185 for retrieval and use by the software vendor. In another preferred embodiment, the dynamic user data 157 may comprise data that enables specific security options in the portable authorization device 140. The dynamic user data 157 is preferably encrypted to prevent unauthorized access to the dynamic user data stored in the storage medium 144. The dynamic user data 157 is encrypted using the key encryptor 284 stored in the program ROM 142.

In a presently preferred embodiment of the invention, the storage medium 144 of the portable authorization device 140 is specific to that individual authorization device. In this embodiment, the processing unit 141 is a secure microcontroller in which the key encryptor 284 stored in the program ROM 142 can be read only with proper authorization. Consequently, even if an unauthorized user copies the encrypted data stored in the storage medium 144 to a second portable authorization device, the second device cannot access the data because the unauthorized user cannot copy the key encryptor 284 used to decrypt the data. An advantage of this feature is that it prevents an unauthorized copy of the dynamic key selectors 171, dynamic user data 157 and other encrypted data stored in the storage medium 144 from being made and used in a duplicate portable authorization device 140.

FIG. 6 shows the format of the dynamic user data 157 as stored in the storage medium 144 of the portable authorization device 140 in a presently preferred embodiment of the invention. This embodiment provides the end-user with the flexibility to select the individual products or features of an item of protected information 115 that he or she wants to use at his or her convenience. For example, the end-user can select which application program to use within a suite of programs. The end-user is allowed to select the desired products or features during the installation process for the protected information 115 via a user interface of the access control program 117.

The dynamic user data 157 is composed of two fields, a 56-bit feature enable field 157(*a*) (shown as "XXXXXXXXXXXX") and an 8-bit feature credit counter 157(*b*) (shown as "YY") (the "X" and "Y" represent hexadecimal numbers). The feature enable field 157(*a*) allows the end-user to enable individual products or features by setting the appropriate bits of the feature enable field 157(*a*). The software developer decides the exact meaning of each bit of the feature enable field 157(*a*) (i.e., what the bit enables). For example, bit 1 of the feature enable field 157(*a*) can be used to turn on a first feature of the host software program and bit 2 can be used to activate a second feature. The procedure for using this feature will be described later.

FIG. 7 illustrates the hardware components of the direct information authority 160. The direct information authority 160 includes a processing unit 161, a storage medium 164 and authorization device interface circuit 165. In a presently preferred embodiment of the invention, the processing unit 161 comprises a microcontroller including a program ROM 162 and a program and data RAM 163. The storage medium 164 in this embodiment comprises an EEPROM. The program ROM 162 and EEPROM 164 store program code and data, respectively, that are executed or operated on by the processing unit 161 during the operation of the direct information authority 160. The authorization device interface circuit 165 is used to provide an electrical interface between the direct information authority 160 and the portable authorization device 140.

It should be noted that although the direct information authority 160 appears similar to the portable authorization device 140 in this embodiment, the direct information authority can be constructed of components having significantly less processing and storage capabilities than those required by the portable authorization device. This is because the portable authorization device 140 participates in the authorization process itself, which is a rather complex process, while the direct information authority 160 merely supplies an item of authorization information 171 that is used in the authorization process.

The direct information authority 160 executes several functional components during its operation in a presently preferred embodiment of the invention. In this embodiment, the functional components are implemented as groups of program instructions stored in the program ROM 162 that are executed by the processing unit 161. In other embodiments, the functional components may be implemented with varying combinations of hardware and software. The functional components of the direct information authority 160 include (not shown):

(1) Authorization device interface. The authorization device interface provides a communications protocol for the direct information authority 160 to communicate with the portable authorization device 140. Information is transmitted between the direct information authority 160 and the portable authorization device 140 via the authorization device interface circuit 165.

(2) Authorization device authenticator. The authorization device authenticator is used to verify the identity of (i.e., authenticate) the portable authorization device 140 so that secure and trusted communications can be established between the direct information authority 160 and the portable authorization device 140. The authentication process is performed before the direct information authority 160 is allowed to access the dynamic key selectors (i.e., authorization information) 171 and other information stored in the portable authorization device 140. In a preferred embodiment of the invention, the authorization device authenticator performs the authentication using a challenge-response transaction. The challenge-response transaction uses the fixed secret key 152 shared by both the direct information authority 160 and the portable authorization device 140 to authenticate the portable authorization device.

FIG. 8 shows the contents of the storage medium (i.e., EEPROM) 164 of the direct information authority 160 in a presently preferred embodiment of the invention. In this embodiment, the contents of the storage medium 164 comprises data that is operated on by the processing unit 161 during operation of the direct information authority 160. Similar data is also stored in the physical and networked indirect information authorities 180 and 185. The data stored in the storage medium 164 comprises:

(1) Key ID 170. The key ID 170 is used to specify the identity of the desired dynamic key selector 171 during a challenge-response transaction, as explained below.

(2) Dynamic key selector (i.e., authorization information) 171. The dynamic key selector 171 is associated with an item of protected information 115. The dynamic key selector 171 is transmitted to the portable authorization device 140 during a key exchange.

(3) Key authorization counter 172. The key authorization counter 172 is used to keep track of and limit the number of times the dynamic key selector 171 can be transferred to a portable authorization device 140.

(4) User data 173. The user data 173 is used to replace or update the dynamic user data 157 stored in the portable storage device 140 during a key exchange, as explained below.

(5) User data authorization counter 174. The user data authorization counter 174 is used to keep track of and limit the number of times the user data 173 can be used to replace or update the user data 157 in a portable authorization device 140.

FIGS. 9 and 10 show the details of the process illustrated in FIG. 2 for selectively authorizing the host system 110 to use an item of protected information 115. FIG. 9 shows the steps performed by a preferred embodiment of the invention to transfer the dynamic key selector (i.e., authorization information) 171 from the information authority 160/180/185 to the portable authorization device 140 (step 210 of FIG. 2). This procedure is known as a "key exchange."

The key exchange process is initiated and controlled by the access control program 117 associated with the item of protected information 115 in conjunction with the host system 110. The operation of the portable authorization device 140 during this process is conducted by the various components stored in the program ROM 142 under the control of the host command processor 280. The host command processor 280 includes security routines to ensure that the access control program 117 cannot overstep its authority in controlling the authorization device, however.

The process for transferring the authorization information 171 is as follows. First, in a present embodiment of the invention, the end-user connects the portable authorization device 140 to a host system 110 (step 211). The portable authorization device 140 in this embodiment receives power from the host system 110 to operate its internal circuitry because it does not have its own power supply.

Second, the end user establishes a connection between the information authority 160/180/185 and the portable authorization device 140 so that the devices may begin communicating with each other (step 212). For the physical direct information authority 160, the end-user first inserts the direct information authority into the portable authorization device 140. The direct information authority interface 286 of the portable authorization device 140 then establishes communications with the direct information authority 160. For the physical indirect information authority 180, the end-user first inserts the physical indirect information authority into the floppy disk drive 113 of the host system 110. The host system interface 281 of the portable authorization device 140 then establishes communications with the physical indirect information authority 180 via the host system 110. For the networked indirect information authority 185, the end-user first establishes a network connection between the networked indirect information authority and the host system 110. The host system interface 281 of the portable authorization device 140 then establishes communications with the networked indirect information authority 185 via the host system 110.

Third, the portable authorization device 140 authenticates the information authority 160/180/185 using a challenge-response transaction (step 213). The authentication process verifies the identity of the information authority 160/180/185 to establish secure and trusted communications with the authority. The direct information authority authenticator 287 performs the authentication of the direct information authority 160, while the host authenticator 283 performs the authentication of the indirect information authorities 180 and 185.

In a preferred embodiment of the invention, the challenge-response transaction for authenticating the information authority 160/180/185 is performed as follows. First, the host authenticator 283 or the direct information authority authenticator 287, as appropriate, of the portable authorization device 140 generates and transmits a challenge message to the respective information authority 160/180/185. The challenge message consists of a large, randomly-generated number. Second, the information authority 160/180/185 generates and sends back a response message based upon a mathematical combination of the challenge message and the fixed secret key 152 stored in the information authority. Third, the respective authenticator 283 or 287 determines if the response message is correct based upon the fixed secret key 152 stored in the portable authorization device 140. If the response message is correct, this indicates that the information authority 160/180/185 properly contains the same fixed secret key 152 as the portable authorization device 140 and that the authentication is successful. Finally, the portable authorization device 140 sends a receipt indicating success or failure of the authentication to the information authority 160/180/185.

Fourth, the portable authorization device 140 optionally verifies that it is authorized to receive the dynamic key selector 171 from the information authority 160/180/185 (step 214). During this step, the information authority 160/180/185 transmits identification information (not shown) associated with the dynamic key selector 171 to the portable authorization device 140. In a preferred embodiment of the invention, the identification information is a number used to uniquely identify the item of protected information 115 authorized by the dynamic key selector 171. In this embodiment, the fixed key ID 151 stored in the storage medium 144 is used to identify the portable authorization device 140. The portable authorization device 140 then determines, based on a comparison of the identification information with the fixed key ID 151, whether the item of protected information 115 identified by the identification information is authorized for use with the portable authorization device. Depending on the outcome of this determination, the portable authorization device 140 then authorizes or declines receipt of the dynamic key selector 171. The authorization process is performed by the message manager 288 of the portable authorization device 140.

An advantage provided by the authorization process is that it allows the dynamic key selector 171 to be targeted at specific types of portable authorization devices 140. For example, the authorization process can be used to ensure that dynamic key selectors 171 from company A's information authority 160/180/185 cannot be placed in company B's portable authorization device 140, or vice-versa.

Fifth, if the authentication and authorization steps successfully complete, the information authority 160/180/185 determines whether the dynamic key selector 171 already exists in the portable authorization device 140 (step 215). The information authority 160/180/185 makes this determination by reading the appropriate location(s) in the dynamic key selector data region 156 of the storage medium 144. If it does, the dynamic key selector 171 is not transferred to the portable authorization device 140.

Sixth, if the dynamic key selector 171 does not exist in the portable authorization device 140, the information authority 160/180/185 determines whether the key authorization counter 172 stored in the storage medium 164 is greater than zero (step 216).

Seventh, if the key authorization counter 172 is greater than zero, the information authority 160/180/185 transmits the dynamic key selector 171 to the portable authorization device 140 (step 217). The information authority 160/180/185 encrypts the dynamic key selector 171 using an encryption algorithm before it is transferred to prevent unauthorized access to the selector during transmission. The portable authorization device 140 performs its part of the dynamic key selector transfer process using the key manager 282 under the control of the message manager 288. During this step, the key authorization counter 172 is decremented by one. If the key authorization counter 172 is zero, however, the information authority 160/180/185 does not transfer the dynamic key selector 171 because the maximum number of transfers has been reached.

Eighth, the portable authorization device 140 encrypts and stores the dynamic key selector 171 in the storage medium 144 (step 218). Since the dynamic key selector 171 is transmitted to the portable authorization device 140 in encrypted form, the dynamic key selector is decrypted before storage. The dynamic key selector 171 is then encrypted using an algorithm unique to the individual portable authorization device 140 and stored in the storage medium 144. The encryption and storage is performed by the key encryptor 284 of the portable authorization device 140. In a presently preferred embodiment of the invention, the dynamic key selector 171 is also blended in the storage medium 144 using the key encryptor 284 to provide increased security. In other embodiments with lesser security requirements, the dynamic key selector 171 is not blended. The dynamic key selector 171 is now stored in the portable authorization device 140 so that the authorization device may be used to authorize a host system 110 to use the item of protected information 115 associated with the dynamic key selector 171.

In a presently preferred embodiment of the invention, the dynamic key selectors 171 may also be removed from the portable authorization device 140 for transfer back to the information authority 160/180/185. Once the dynamic key selector 171 is returned to the information authority 160/180/185, the dynamic key selector 171 can then be transferred to another portable authorization device 140'. An advantage of this feature is that unused dynamic key selectors 171 stored in the portable authorization device 140 can be "reused" in another portable authorization device.

The dynamic key selector removal is performed by the key manager 282 in coordination with the key encryptor 284. The process for transferring the dynamic key selectors 171 back to the information authority 160/180/185 is similar to the process for transferring the dynamic key selectors from the information authority to the portable authorization device 140 shown in FIG. 9, except that the fifth through eighth steps are replaced as follows (steps 215-218).

Fifth, if the authentication and authorization steps successfully complete, the portable authorization device 140 determines whether the dynamic key selector 171 already exists in the information authority 160/180/185. If it does, the dynamic key selector 171 does not need to be transferred to the information authority 160/180/185. If it does not, a key authorization counter 172 is created in the storage medium 164 of the information authority 160/180/185 and is set to zero.

Sixth, the portable authorization device 140 locates, reads and decrypts the dynamic key selector 171 from the storage medium 144 of the portable authorization device 140. The decryption is performed by the key encryptor 284 of the portable authorization device 140. In a presently preferred embodiment of the invention where the dynamic key selector 171 is blended, the dynamic key selector is also unblended using the key encryptor 284.

Seventh, the portable authorization device 140 transfers the dynamic key selector 171 to the information authority 160/180/185. The portable authorization device 140 encrypts the dynamic key selector 171 before it is transferred to prevent unauthorized access to the selector during transmission. The portable authorization device 140 performs its part of the dynamic key selector transfer process using the key manager 282 under the control of the message manager 288. During this step, the key authorization counter 172 is incremented by one.

Eighth, the information authority 160/180/185 encrypts and stores the dynamic key selector 171 in the storage medium 164. Since the dynamic key selector 171 is transmitted to the information authority 160/180/185 in encrypted form, the dynamic key selector is decrypted before storage. The dynamic key selector 171 is then encrypted and stored in the storage medium 164. Upon completion of this step, the dynamic key selector 171 is ready for transfer to another portable authorization device 140'.

In a presently preferred embodiment of the invention, the information authority 160/180/185 may also replace or update the dynamic user data 157 in the storage medium 144 of the portable authorization device 140 following the transfer of the authorization information 171 (step 215 of FIG. 9). As mentioned earlier, the dynamic user data 157 may comprise, for example, registration information pertaining to the portable authorization device 140 or data for enabling security options in the authorization device. The procedure by which the dynamic user data 157 is replaced or updated is as follows. First, the user data authorization counter 174 is transmitted from the information authority 160/180/185 to the portable authorization device 140 using a challenge-response transaction. Second, if the user data authorization counter 174 is greater than zero, the information authority 160/180/185 uses the user data 173 to replace or update the dynamic user data 157 of the portable authorization device 140. Replacement of the dynamic user data 157 consists of overwriting the existing user data stored in the portable authorization device 140. Updating of the dynamic user data 157 consists of performing an operation on the existing user data to change its value. Whether the dynamic user data 157 is replaced or updated depends on the nature of the user data. Third, the user data authorization counter 174 is decremented by one. If the user data authorization counter 174 is zero, however, the information authority 160/180/185 does not replace or update the dynamic user data 157 because the maximum number of transfers has been reached.

In some embodiments of the invention, it may not be necessary to replace or update the dynamic user data 157 in the portable authorization device 140. For example, the dynamic user data 157 in a portable authorization device 140 may be more recent than the user data 173 in the information authority 160/180/185. In this case, it would not make sense to overwrite the newer dynamic user data 157 in the portable authorization device 140. As a result, the developer's product will be given the opportunity, through PACE Application Programming Interfaces (APIs), to check and avoid any dynamic user data updates that do not make sense.

In a presently preferred embodiment of the invention, the portable authorization device 140 may also transfer the dynamic user data 157 associated with an item of protected information 115 back to the information authority 160/180/185. The user data transfer is performed by the key manager 282 of the portable authorization device 140. An advantage of this feature is that the software vendors for the items of protected information 115 authorized by the portable authorization device 140 are able to obtain information from and about the end-user of the device, such as registration information or the identity of the other programs or data stored on the portable authorization device 140.

FIG. 10 shows the steps of the process by which the portable authorization device 140 authorizes the host system 110 to use an item of protected information 115 (step 220 of FIG. 2). The authorization process is initiated and controlled by the access control program 117 associated with the item of protected information 115 in conjunction with the host system 110. The operation of the portable authorization device 140 during this process is conducted by the various components stored in the program ROM 142 under the control of the host command processor 280. The host command processor 280 includes security routines to ensure that the access control program 117 cannot overstep its authority in controlling the authorization device, however.

The process for authorizing the host system 110 is as follows. First, the end-user connects the portable authorization device 140 to the host system 110 associated with the item of protected information 115 he or she desires to use (step 221).

Second, the end-user begins executing or accessing the item of protected information 115, such as a software program or a collection of data stored on the host system 110 (step 222). The access control program 117 associated with the item of protected information 115 halts the execution or access of the protected information 115, however, because it has not yet received the proper authorization. In a presently preferred embodiment of the invention, the access control program 117 displays messages on the host system 110 indicating that the program or data is not authorized to be executed or accessed and prompting the end-user to connect the portable authorization device 140 to the host system to resume execution.

Third, a password manager of the access control program 117 displays a message on the host system 110 prompting the end-user to enter a password for the portable authorization device 140 (step 223). The password manager then verifies that the entered password is correct by checking the entered password against the password 154 for the portable authorization device 140. The password 154 is stored in encrypted form in the storage medium 144 of the portable storage device 140 so that it cannot be read by an unauthorized user. A user interface of the password manager allows the end-user to set the password 154 upon correctly entering the original password value. In a presently preferred embodiment of the invention, the end-user is required to enter a password only to use the portable authorization device 140 for the first time on a new host system 110. The password requesting step is optional but is performed in a presently preferred embodiment of the invention. An advantage of this feature is that it protects against the use of the portable authorization device 140 by an unauthorized user.

In the fourth through eighth steps described next, the access control program 117 of the host system 110 and the portable authorization device 140 conduct a challenge-response transaction to determine whether the authorization device contains the proper authorization information for the item of protected information 115. In the fourth step, the access control program 117 on the host system 110 initiates the challenge-response transaction with the portable authorization device 140 by sending a challenge message to the portable authorization device (step 224). The challenge-response transaction determines whether the portable authorization device 140 contains the correct authorization information associated with the item of protected information 115. The challenge-response transaction does not transmit any authorization information from the portable authorization device 140 to the host system 110, thereby preventing the authorization information from being intercepted by an unauthorized person. In a presently preferred embodiment of the invention, the challenge message is a randomly-generated number. The challenge message in this embodiment is transmitted to the portable authorization device 140 together with the key ID 170 associated with the item of protected information 115.

Fifth, the portable authorization device 140 initiates a response to the challenge message by generating the secret key 175 from the dynamic key selector 171 (step 225). The portable authorization device 140 first searches the storage medium 144 for the dynamic key selector 171 corresponding to the key ID 170. During the search, the dynamic key selector data 156 stored in the storage medium 144 is decrypted and unblended to temporarily regenerate the dynamic key selectors 171. Specifically, the unblending process consists of regenerating each dynamic key selector 171 from one or more items of dynamic key selector data 156. This process is performed by the host authorizer 285 in coordination with the key manager 282 and the key encryptor 284.

If the correct dynamic key selector 171 is present, the portable authorization device 140 generates the secret key 175 using the host authorizer 285 of the portable authorization device 240. The secret key 175 is generated by mathematically combining the dynamic key selector 171 that corresponds to the key ID 170 with the dynamic seed 155. In other embodiments in which the secret key 175 itself is stored in the portable authorization device 140, this step is skipped. In a presently preferred embodiment containing dynamic key selector data 156, the dynamic key selector 171 is unblended during this step, as described below.

Sixth, the portable authorization device 140 generates and transmits a response message to the host system 110 (step 226). The response message is generated using an algorithm that mathematically combines the challenge message and the secret key 175. The response message is generated by the host authorizer 285 of the portable authorization device 140. In a presently preferred embodiment of the invention, the response message is a mathematical combination of the challenge message and the key generated by the portable authorization device 140.

Seventh, the access control program 117 verifies that the portable authorization device 140 returns a response message and further, that the response message is correct (step 227).

Eighth, if the response message is correct, the access control program 117 authorizes the host system 110 to use the item of protected information 115, e.g., to execute the software program or access the data (step 228).

The challenge-response transaction used by the authorization process just described may be performed using one of several algorithms. In one preferred embodiment of the invention, the challenge-response transaction uses a symmetric algorithm. In the symmetric algorithm, the secret key 175 is the same for the host system 110 and the portable authorization device 140. In another preferred embodiment, the challenge-response transaction uses an asymmetric algorithm. In the asymmetric algorithm, the secret key 175' for the host system 110 is different from the secret key 175 for the portable authorization device 140, where a predetermined mathematical relationship exists between the two keys. An advantage of the asymmetric algorithm is that an unauthorized user cannot generate the correct response message merely by obtaining access to the secret key 175' from the host system 110.

In a presently preferred embodiment of the invention, the encryption algorithm used to encrypt and decrypt the dynamic key selectors 171 stored in the storage medium 144 may be changed in the field as required. The key encryptor 284 in this embodiment is capable of performing a number of different encryption algorithms, one of which is selected for use at any given time. The encryption algorithm is selected by transmitting encryption algorithm selection information (not shown), either from the information authority 160/180/185 or the host system 110, to the portable authorization device 140. The software vendor may transmit the algorithm selection information together with messages (e.g., for product updates) encrypted using the new algorithm. Once the encryption algorithm is changed, the authorization information 171, dynamic user data 157 and other data encrypted using the previous algorithm cannot be used by the portable authorization device 140. An advantage of this feature is that it enables software vendors to readily change in the field the encryption algorithm used by the portable authorization device 140 if the original encryption algorithm is discovered, thereby making it difficult for the authorization device to be tampered with or used in an unauthorized manner.

In this embodiment, the algorithm used to generate the response message during the challenge-response transaction may also be changed in the field as required. The host authorizer 285 is capable of generating the response message using a number of different algorithms, one of which is selected for use at any given time. The response algorithm is selected by transmitting response algorithm selection information (not shown), either from the information authority 160/180/185 or the host system 110, to the portable authorization device 140. Once the response algorithm is changed, the items of protected information 115 must be replaced or updated with new versions compatible with the new algorithm to work with the portable authorization device 140. An advantage of this feature is that it enables software vendors to readily change in the field the response algorithm used by the portable authorization device 140 if the original encryption algorithm is discovered, thereby making it difficult for the authorization device to be tampered with or used in an unauthorized manner.

In a presently preferred embodiment of the invention, following the authorization process of FIG. 10, the portable authorization device 140 may also transfer selected dynamic user data 157 to the host system 110. The dynamic user data 157 transferred only if requested by the software program (i.e., protected information 115) associated with the host system. The dynamic user data 157 is transferred under the control of the host software program, rather than the access control program 117. The host software program first sends a request to read the selected dynamic user data 157 from the portable authorization device 140. The request specifies the key ID associated with the selected dynamic user data 157. The portable authorization device 140 then returns the selected dynamic user data 157 to the host system 110.

Referring again to FIG. 8, the process for enabling specific features or products in a presently preferred embodiment of the invention is as follows. The bits of the feature enable field 157(a) are initialized to a logic value of zero, indicating that none of the features or products are enabled. Through a user interface provided by the item of protected information 115 (e.g., the host software program), the end-user buys or enables the desired features or products by setting the appropriate bits of the feature enable field 157(a) to a logic value of one. For every feature/product enabled, the feature credit counter 157(b) is decremented by one. Once the feature credit counter 157(b) reaches zero, no more features or products can be purchased or enabled for that item of protected information 115 until the end-user buys more counts via the information authorities 160/180/185 or some other secure key authority. It should be noted that the purchase or enabling of a feature or product is final. In other words, once a bit of the feature enable field 157(*a*) is set and the feature credit counter 157(*b*) decremented, the bit cannot be traded back for a count in the feature credit counter.

FIG. 11 illustrates an exemplary algorithm for blending and unblending the dynamic key selector data 156 stored in the storage medium 144 of the portable authorization device 140. The algorithm is described for illustrative purposes only and other more simple or complex algorithms may be readily substituted by those skilled in the art, depending on the degree of security required and the processing and storage capabilities of the portable authorization device 140. The illustrated algorithm uses relatively simple addition and subtraction operations to perform the dynamic key selector blending and unblending operations. The algorithm is implemented by the key encryptor 284 stored in the program ROM 142.

The figure shows three items of dynamic key selector data 156', 156" and 156''' and three dynamic key selectors 171', 171" and 171''' (shown as hexadecimal numbers). Each item of dynamic key selector data 156', 156" and 156''' comprises data derived from the blending of two of the three dynamic key selectors 171', 171" and 171'''. The items of dynamic key selector data 156', 156" and 156''' are stored at adjacent locations in the storage medium 144 of the portable authorization device 140 and are generated from the three dynamic key selectors 171', 171" and 171'''. The dynamic key selectors 171', 171" and 171''' are dynamic key selectors that are transmitted sequentially from one or more information authorities 160/180/185 for storage in the portable authorization device 140. Each item of dynamic key selector data 156', 156" and 156''' and each dynamic key selector 171', 171" and 171''' is 32 bits wide. For this algorithm, each item of dynamic key selector data 156 is divided into two 16-bit halves, 156(*a*) and 156(*b*). Each dynamic key selector 171 is also divided into two 16-bit halves, 171(*a*) and 171(*b*).

The blending procedure using this key blending algorithm is described as follows, using the blending of dynamic key selectors to generate the item of dynamic key selector data 156" as an example. The first half of the dynamic key selector data item 156(*a*)" ("3333") is generated simply by transmitting the first half of the dynamic key selector 171(*a*)" ("3333"). The second half of the dynamic key selector data item 156(*b*)" ("CCCC") is generated by adding the second half of the dynamic key selector 171(*b*)" ("4444") and the first half of the third dynamic key selector 171(*a*)''' ("8888"). Thus, the item of dynamic key selector data 156" is derived from the two dynamic key selectors 171" and 171'''. Consequently, the dynamic key selector data 156 stored in the storage medium 144 cannot be partitioned into segments exclusively associated with individual dynamic key selectors.

The unblending procedure using this key blending algorithm is simply the reverse of the blending procedure. The first half of the dynamic key selector 171(*a*)" ("3333") is generated simply by transmitting the first half of the dynamic key selector data item 156(*a*)"("3333"). The second half of the dynamic key selector 171(*b*)" ("4444") is generated by subtracting the first half of the third dynamic key selector data item 156(*a*)''' ("8888") from the second half of the dynamic key selector data item 156(*b*)" ("CCCC"). Thus, the dynamic key selector 171" is derived from the two items of dynamic key selector data 156" and 156'''.

Direct Authorization Device-Authorization Device Key Exchange Embodiment

FIG. 12 illustrates an alternative embodiment of the invention providing a direct key exchange between two portable authorization devices 140 and 140'. In this embodiment, a dynamic key selector 171 stored in the portable authorization device 140 is transferred directly to a second portable authorization device 140' via a Universal Serial Bus (USB) hub 190. The USB hub 190 is an I/O device known in the art that is connected to a USB port of the host system 110. The process for transferring the dynamic key selector 171 from the portable authorization device 140 to the device 140' is as follows. First, the end-user connects the portable authorization devices 140 and 140' to the USB hub 190. Second, the portable authorization devices 140 and 140' authenticate each other using a challenge-response transaction. The authentication process verifies the identity of the two devices and establish trusted communications between them. Finally, if the authentication is successful, the secret key 175 is transferred from the portable authorization device 140 to the device 140' through the USB hub 190. An advantage of this embodiment is that dynamic key selectors 171 can transferred between portable authorization devices in one step without requiring the use of an information authority 160/180/185.

Authorization Device Reconstruction Embodiment

Another alternative embodiment of the invention provides an authorization log file (not shown) for securely reconstructing the portable authorization device 140. The authorization log file is stored on the host system 110 to which the portable authorization device 140 is connected. An advantage of this embodiment is that it enables the portable authorization device 140 to be securely reconstructed in case the device is misplaced or stolen.

The authorization log file consists of reconstruction data for reconstructing the authorization information stored on the portable authorization device 140. Specifically, the authorization log file contains information identifying the items of authorization information (e.g., dynamic key selectors) 171 stored in the portable authorization device 140. The authorization log file does not contain the items of authorization information themselves, however. The authorization log file is stored in encrypted form on the hard disk drive of the host system 110 in a hidden location. The authorization log file is generated by the portable authorization device 140 at the request of the access control program 117 associated with the host system 110.

The portable authorization device 140 is reconstructed using the authorization log file as follows. The reconstruction is performed in a secure environment under the supervision of the manufacturer of the portable authorization device or some other authorized party. First, the authorization log file is read from the hard disk drive of the host system 110 to identify the items of authorization information 171 stored in the original portable authorization device 140. Second, the manufacturer or other authorized party retrieves from secure storage the items of authorization information 171 identified by the authorization log file. Finally, the retrieved items of authorization information 171 are stored in the storage medium 144' of the replacement portable authorization device 140' to form a reconstruction of the original portable authorization device 140.

While specific embodiments of the invention have been described and illustrated, it will be appreciated that modifications can be made to these embodiments without departing from the spirit of the invention. Therefore, it is intended that the scope of the invention be defined by the following claims and their equivalents.

The invention claimed is:

1. A portable security device removably coupled to a computer system for selectively authorizing the computer system to use multiple items of protected information, comprising:
a processing unit;
at least one storage medium coupled to the processing unit;

an interface that receives multiple key selectors that are associated with respective ones of the multiple items of protected information, wherein the multiple key selectors are stored within the at least one storage medium; and wherein the multiple items of protected information have been protected using encryption keys that are mathematically derived from respective ones of the key selectors that are associated with the multiple items of protected information; and an interface program that selectively authorizes use of a particular one of the items of protected information on the computer system, only if a corresponding one of the key selectors is stored in the storage medium, by generating one of the encryption keys within the portable security device from the corresponding one of the key selectors, the interface program further sending the encryption key to the computer system to authorize of the computer system to use the particular one of the items of protected information associated with the corresponding one of the key selectors.

2. The method of claim 1 wherein one or more of the multiple items of authorization information are provided by an information authority, wherein at least a portion of the multiple items of authorization information comprise user data terms that control at least one of enabling and disabling of individual features of the corresponding item of protected information.

3. The method of claim 2 wherein the information authority issues credits to the end-user and the end-user uses the credits to enable/disable individual features of the corresponding item of protected information through a user interface provided by the item of protected information.

4. The method of claim 1 wherein the one or more key selectors each comprise one or more secret keys.

5. The method of claim 4 wherein the secret key is used to generate a response message as part of a challenge-response transaction.

6. The method of claim 5 wherein the secret key is used to encrypt or decrypt data using a symmetric algorithm.

7. The method of claim 5 wherein the secret key is used to encrypt or decrypt data using an asymmetric algorithm.

8. The method of claim 1 wherein the one or more key selectors are used to derive secret keys.

9. The method of claim 1 wherein the portable security device further includes an ID that uniquely identifies the portable security device.

10. The method of claim 1 wherein the portable security device further includes a product type ID that identifies a product type of the portable security device to authorization of the protected items of information to be targeted at specific types of portable authorization devices.

11. The method of claim 1 wherein the one or more key selectors are encrypted using an algorithm unique to the portable security device and stored in the storage medium.

12. The method of claim 1 wherein at least one of the items of one or more key selectors can be at least one of added, updated and removed within the portable security device using a cryptographically secure exchange of data between the device and a key authority.

13. The method of claim 12 wherein the secure exchange of data includes an ID that uniquely identifies the portable security device.

14. The method of claim 12 wherein the secure exchange of data includes a challenge and a cryptographic response based on the challenge.

15. The method of claim 12 wherein the portable security device exchanges data with a physical direct information authority.

16. The method of claim 12 wherein the portable security device exchanges data with a physical indirect direct information authority.

17. The method of claim 12 wherein the portable security device exchanges data with a networked indirect information authority using one or more interfaces of the computer system.

18. The method of claim 1 wherein algorithms within the portable security device can be changed through an exchange of data with an information authority.

19. The method of claim 18 wherein the exchange of data includes an ID that uniquely identifies the portable security device.

20. The method of claim 18 wherein the secure exchange of data includes a challenge and a cryptographic response based on the challenge.

21. The method of claim 18 wherein the portable security device exchanges data with a physical direct information authority.

22. The method of claim 18 wherein the portable security device exchanges data with a physical indirect direct information authority.

23. The method of claim 18 wherein the portable security device exchanges data with a networked indirect information authority using one or more interfaces of the computer system.

24. The method of claim 1 wherein the end-user can set a password to control access to the portable security device.

25. The method of claim 1 wherein the portable security device comprises a smart card.

26. A method for operating a single dongle for selectively authorizing a host system to use one or more items of protected information stored therein, including software, comprising:

coupling the dongle to the host system;

receiving a first key selector through the host system from a first vendor, wherein the first key selector is associated with a first one of the items of protected information that was encrypted with a first encryption key and provided by the first vendor;

receiving a second key selector through the host system from a second vendor, wherein the second key selector is associated with a second one of the items of protected information that was encrypted with a second encryption key and provided by the second vendor; and in response to receiving a subsequent request from the host system to access the one or more items of protected information, selectively authorizing the host system to only use the first or second items of protected information if the first or second key selectors are stored within the dongle, by generating either the first or second encryption keys within the portable security device from either the first or second key selectors, and sending the first or second encryption keys to the host system to authorize of the host system to use the one of the items of protected information associated with the first or second key selectors.

27. A method for protecting one or more pieces of software from unauthorized use on a computer system using an external security device removably coupled to the computer system, the method comprising:

a) encrypting the one or more pieces of software to be protected using encryption keys that are mathematically derived from respective authorization keys that are associated with the one or more pieces of software;
b) authorizing the use of a particular piece of software on the computer system, only if a corresponding authorization key is present in the security device, by generating one of the encryption keys in the security device from the corresponding authorization key; and
c) sending the encryption key from the security device to the computer system for the decryption of the software.

\* \* \* \* \*